Dec. 16, 1941.  W. L. JEFFREY  2,266,207

TREE MOVER

Filed July 20, 1940

Inventor:
Wallace L. Jeffrey,

By Rummler Rummler & Davis
Attorneys.

Witnesses:

Patented Dec. 16, 1941

2,266,207

UNITED STATES PATENT OFFICE 2,266,207

TREE MOVER

Wallace L. Jeffrey, Fulton, Mo.

Application July 20, 1940, Serial No. 346,560

5 Claims. (Cl. 214—3)

This invention relates to endwise-tilting tree movers of the general type shown in my copending application, Serial No. 263,815 filed March 23, 1939, now Patent No. 2,208,262. More especially it has to do with the position of the back running gear relative to the bunk and cradle carrying part or body of the mover and to adjustment thereof according to current needs.

I have found by numerous working tests of my various styles and models of tree movers, that without this and especially without some longitudinal adjustment of the load relative to the pivot axle and rear wheels, in securing the tree and adjusting the mover for lifting and pulling away from the ground hole and vice versa, there is manifest at times a dangerous tendency for the load to upset, as by rearward tilting, and also ground failure at the edge of the hole. This tendency occurs with trees having large and heavy root-balls, especially when the mover is set for handling a tree on uneven or slanting ground.

My invention accommodates load balancing adjustments for road travel, so as to avoid too much tendency to tilt. Even though such tendency does not actually lift the forward running gear off the ground, there is a tendency for the mover to wobble, that is avoided in vehicles loaded for resting a considerable part of the load on the front wheels.

The main objects of my invention are directed to stabilizing the mover and its load both for loading and unloading and for travel; and more specifically to provide for shifting the load forwardly and backwardly in a positive manner across the tilting axis; and especially to stabilize the load by moving it peakwardly of the tower chassis and there securing it, for backing away from the hole and for travel after loading, so as to avoid any possibility of tipping and upsetting, especially on grades in the line of travel over hilly roads. I also wish to provide for increasing the downward reach of the root-cradle and its support when the body or derrick-tower style of chassis is upended for loading and for restoring the rear axle backwardly after loading. Other objects are directed to low cost and to simplicity in construction and operation as will appear.

This invention is illustrated by the accompanying drawing in which.

Figure 1:
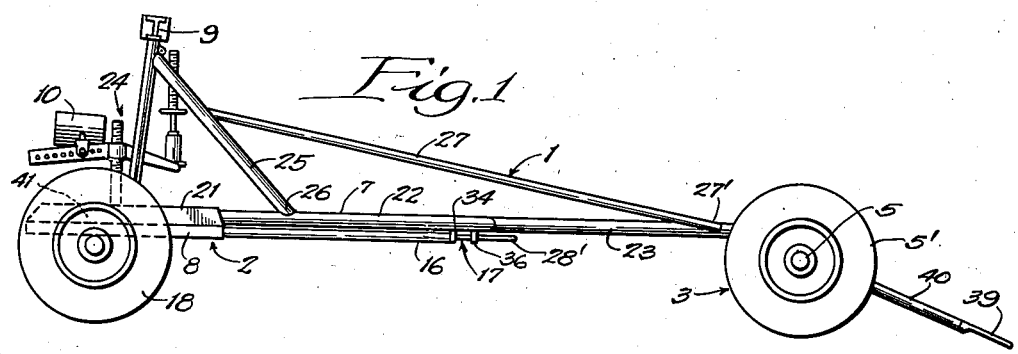
Figure 1 is a side elevation of my improved tree mover in its empty, road travel position, with the front running gear secured to the tip of the "tower" part.

Referring further to the drawing, the tree mover 1 comprises the main assemblage 2 and the front running gear 3 connected turnably by the pin 4 centrally of the front axle 5 where the tip 6 of the V-shaped tower chassis 7 is detachably connected for no-load travel. On said axle 5 are wheels 5'.

Figure 2:
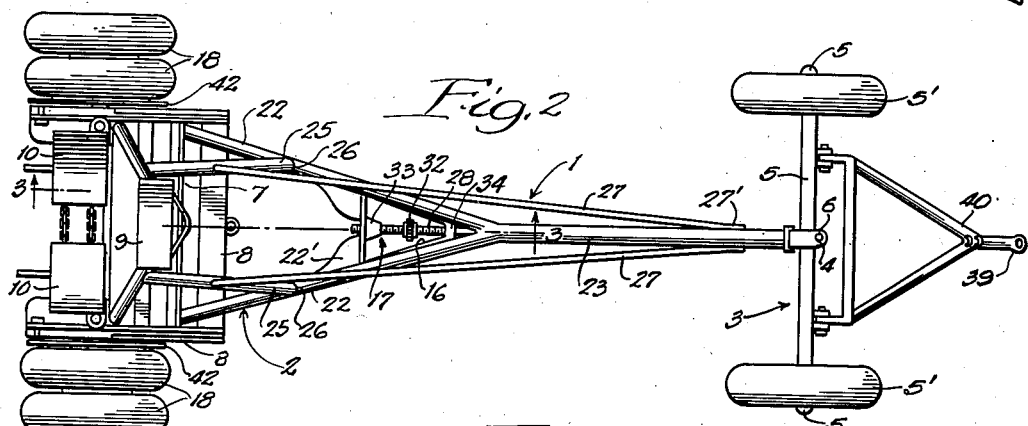
Fig. 2 is a plan of the tree mover positioned as in Fig. 1.
Figure 3:
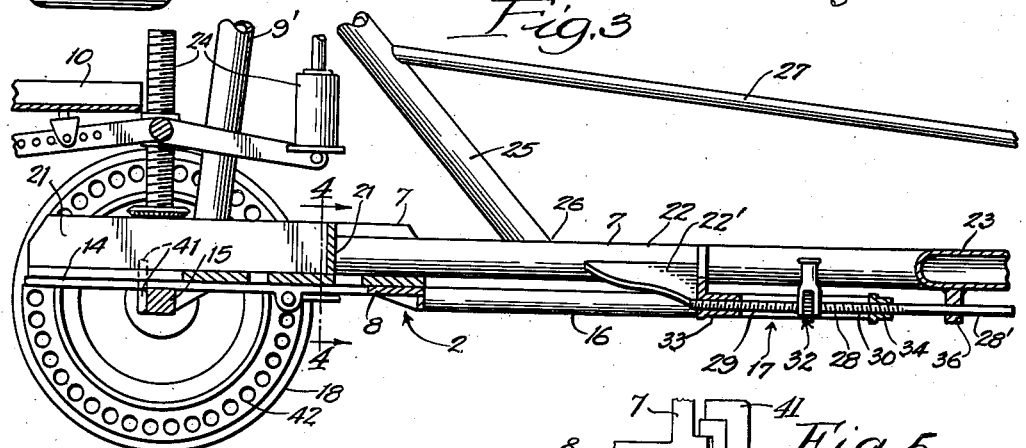
Fig. 3 is an enlarged view mainly in longitudinal section, substantially on the line 3—3 of Fig. 2 and shows the pivot wheels and their slide frame about midway in their forward and backward range of movement relative to the main chassis or tower part which rests thereon.
Figures 4, 5:
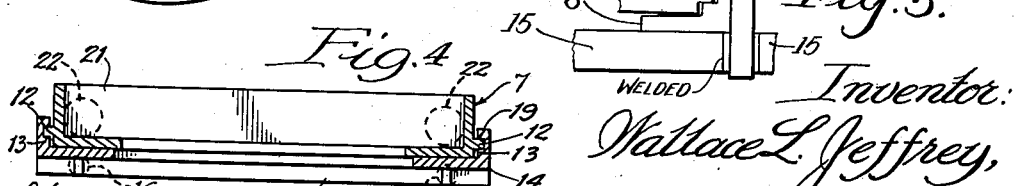
Fig. 4 is a cross section on the line 4—4 of Fig. 3, and shows the slidable relation of the upper and lower body parts, fitted laterally with tongue and groove slide means.
Fig. 5 is a rear elevation of the right hand part of the underframe and bunk-chassis where they slidably interconnect and are reinforced by a side hook or lug welded to the axle.

My present invention resides in the broad rearward part (left as viewed in Figs. 1 to 3) of the body 2, taken as a whole, and especially in the forward-and-back shifting relation of the rear running gear and underframe 8 with reference to the bunk and cradle supporting chassis 7. Here the bunk 9 and cradle 10 are mounted on the broad pivotal end of said chassis substantially as in my previous movers; and the special frame or undercarriage 8 is movable lengthwise of the tower-chassis 7 on slideway guides 12—13 as will be explained.

Rear running gear and under-carriage

The undercarriage 8 on which the body or V-chassis 7 is adjustably mounted comprises substantially a rectangular frame 14 on the underside of which somewhat back of the middle, a pivot axle 15 is rigidly secured and on the forward part of which are a pair of forward reach-bars or side-rails 16 which converge V-wise to support a kind of screwjack or turnbuckle device 17 hereinafter described. The undercarriage 8 is mounted on wheels 18 at the ends of said axle 15.

In order to prevent separation and yet accommodate ready forward and backward movement relative to chassis 7, the said undercarriage 8 is provided with the lateral guide-rails 13 having inwardly facing grooves 19 to receive the corresponding tonguelike guide rails or beads 12 formed on the chassis 7.

The main body or tower chassis structure

The V-chassis or tower member 7 comprises mainly a rectangular rearward frame part 21 having convergent forwardly reaching side bars 22 fixed thereon and having secured thereto, on their side, appropriate parts of the turnbuckle device 17 above referred to and to be further described. Said bars 22 are joined to a forward extension bar 23. On the rearward part of this chassis 7 I mount the said bunk 9 and cradle 10 for supporting the tree trunk and root ball, substantially as described in my previous applications. The said bunk and the associated cradle control mechanism 24 are braced by a pair of bars 25, the forward ends of which are secured at 26 to said bars 22. Supplemental braces 27 join the bars 25 medially thereof to the front end of bar 23 at 27' near the tip 6.

Turnbuckle structure and operation

The said turnbuckle device 17 by which the chassis 7 is forced forward and backward on said undercarriage 8 comprises a shaft 28 oppositely threaded at or near its ends as at 29 and 30 and provided centrally with reversible ratchet drive means 32 for applying a wrench, ratchet, handle, or the like, in combination with a threaded nut member 33 rigidly secured by wings 22' to the chassis bars 22 for engaging the rear (left) end 29 of said shaft and another threaded nut member 34 rigidly secured to the undercarriage at the forward end or junction of bars 16 for engaging the front (right) end 30 of the shaft. When the turnbuckle shaft 28 is turned one way, the said nut members on said parts 8 and 7 are drawn together and vice versa, so that the undercarriage 8 is accordingly pushed backward (to the left in Fig. 2) or drawn forward (to the right) relative to the tower chassis 7. I often refer to this jack as a retractor.

In order positively to maintain and support the turnbuckle shaft 28 in due position and parallel alignment relative to shaft 23, a downward guide lug 36 is fixed on the latter in front of nut members 33 and 34 to receive a forward extension 28' of screw-shaft 28.

Operation

For no-load travel the mover 1 is assembled as in Fig. 1 and the tip 39 of tongue 40 is attached for trailer pull action to a tractor, not shown. Upon arrival at the tree to be moved, which preferably has already been prepared, the running gear 3 is disconnected at 4. The tower chassis or body 2 is then stood up against the tree with the bunk 9 against the trunk, the wheels 18 being locked as described in my prior application, and the cradle 10 is set against the rootball. Customary tackle is applied to secure the tower part 23 to the tree and further tackle is connected to the top of the tower at 6 and to the root ball with a portion running off to a winch on a truck (not shown) for pulling the tower and tree over to an inclined or horizontal position, all substantially as set forth in my previous applications; and thereupon the running gear 3 is connected to the other end or pivotal axle-part of V-chassis 7, also as usual, except as will now be explained.

In applying the cradle 10 to the rootball, its downward reach may be adjusted according to the depth of the ball and the excavation thereabout. For instance, with a tree having a deep rootball, I rotate the turnbuckle shaft 28 so as to increase the distance between the nuts 33 and 34. This lowers the V-chassis or tower 7 with its cradle and bunk relative to the subframe or undercarriage 8. The wheels 18 are then locked, through the rigid circular perforated plate 42 in the manner described in my copending application, Serial No. 325,018, filed March 20, 1940 for Locking attachments for tree movers. Then after the tower 7 and tree have been swung down and the tree thereby loaded (in the manner described in my copending application, Serial No. 291,195, filed August 21, 1939), the turnbuckle may be turned reversely and so the chassis 7 and its load pull peakward, away from the hole and crosswise of the axle 15. Then the loaded chassis is pulled bodily with its load away from the hole. The chassis is preferably further locked to the undercarriage by a pair of side hooks 41 which are welded to the cradle side of axle 15. The forward running gear 3 is then connected to the axle end of the chassis, by a short reach such as explained in my aforesaid copending application Serial No. 291,195. The turnbuckle 17 may then be adjusted to place the center of gravity as most satisfactory for travel.

Upon arrival at the new location the turnbuckle is adjusted to bring the rootball forward (peakward) close to axle 15. Then the chassis 7 is backed into place and the tower and tree swung upward over the hole. Then the turnbuckle, now in tension, may be turned to lower the chassis and tree if desirable to assist in duly placing the rootball well down in the hole, whereupon the mover may be disconnected and taken away.

In general practice I sometimes set the retractor jack 17 so that the upper frame or V-tower chassis 7 when upended to a tree can be lowered two or three inches from normal position, thus allowing the wheels to stand on planks or the like where the ground is muddy while keeping the ball carrier in the same relationship to the rootball as when the wheels stand on bare ground. The retractor is designed to draw the load and main frame back across the axle 15 about ten inches from normal position making a total shift of twelve inches.

In my first tryout of a practical embodiment of this invention I used the maximum retraction, with the jack drawn up tight, on a very heavy rootball load, and so set I backed the mover away from the hole up a 15% grade, without any sand bags or other counterweight ballast, and there was no threat of the mover upending.

It is to be understood that some of the details set forth may be altered or omitted without departing from the spirit of this invention as defined by the following claims.

I claim:

1. In an endwise tilting tree mover of the class described an elongated triangular body having tree receiving bunk and cradle members at its broad rear end, in combination with a two-wheeled subframe secured slidably to the rearward underside thereof for forward and backward movement to shift the tilting axis of the mover, said subframe having arms secured to its sides and extending convergently forward and screw means disposed lengthwise of the mover and connecting said arms to the forward part of said body for effecting positive adjustments of said body and subframe according to safety needs.

2. In a tree mover a load-carrying body of elongated design having at its rear end a cradle for the root ball and a bunk to receive the tree trunk, in combination with an undercarriage slidably connected to the underside of said body, tread wheels for said undercarriage and manual control means to adjustably shift said undercarriage relative to said body and its load according to current needs, said undercarriage and body having interfitting means to accommodate such shifting and control.

3. A device of the class described comprising in combination an elongated load-carrying body and an undercarriage shiftably related thereto for relative forward and backward movement of said members according to current needs and desire, said members on their forward parts have mutually aligned and oppositely threaded lugs respectively one in front of the other normally in more-or-less spaced relation and having a correspondingly threaded bar connecting them in jack relation and a reversible ratchet drive means on said bar adapted for manual operation to shift said undercarriage forward and backward, said body having another lug aligned with said lugs and on the opposite side of the undercarriage lug and perforated so as to receive the corresponding end of said bar, which is extended on this end, and so maintain said bar in due alignment substantially parallel with the direction of slide movement and so also maintain said forward parts of said body and undercarriage in substantially parallel relation.

4. In an endwise tilting tree mover of the class described, an endwise tiltable body adapted in one of its positions to stand against a tree to be moved, and a pair of wheels for the body, said body being provided with a cradle for the rootball and a bunk for the tree trunk and including a lower part having a rearward axle for said wheels and an upper part longitudinally slidable with respect thereto for shifting the load forward and backward.

5. In an endwise tilting tree mover of the class described, and endwise tiltable body adapted in one position to stand against a tree to be moved, a pair of wheels for the body, said body being provided at one end with a cradle for the rootball and a bunk at the other end for the tree trunk and including a lower part having a rearward axle for said wheels and an upper part longitudinally slidable on the lower part, and centrally arranged longitudinally disposed screw means located between the bunk and the cradle and connecting the upper and lower parts of the body for shifting the load forward and backward.

WALLACE L. JEFFREY.